US011319748B2

(12) United States Patent
Raab et al.

(10) Patent No.: US 11,319,748 B2
(45) Date of Patent: May 3, 2022

(54) REFRIGERATOR

(71) Applicant: BSH HAUSGERAETE GMBH, Munich (DE)

(72) Inventors: Alfred Raab, Huettlingen (DE); Oliver Elser, Koenigsbronn (DE); Simon Hillmann, Dischingen (DE); Markus Mayer, Koenigsbronn (DE); Juergen Diebold, Hermaringen (DE)

(73) Assignee: BSH Hausgeraete GmbH, Munich (DE)

( * ) Notice: Subject to any disclaimer, the term of this patent is extended or adjusted under 35 U.S.C. 154(b) by 0 days.

(21) Appl. No.: 16/624,941

(22) PCT Filed: Jul. 19, 2018

(86) PCT No.: PCT/EP2018/069580
§ 371 (c)(1),
(2) Date: Dec. 20, 2019

(87) PCT Pub. No.: WO2019/034358
PCT Pub. Date: Feb. 21, 2019

(65) Prior Publication Data
US 2021/0032929 A1    Feb. 4, 2021

(30) Foreign Application Priority Data

Aug. 16, 2017 (DE) .................. 10 2017 214 239.1

(51) Int. Cl.
*E06B 7/23* (2006.01)
*F25D 23/02* (2006.01)
(Continued)

(52) U.S. Cl.
CPC .......... *E06B 7/2309* (2013.01); *F25D 23/028* (2013.01); *F25D 23/087* (2013.01); *F25D 23/025* (2013.01); *F25D 23/069* (2013.01)

(58) Field of Classification Search
CPC .... F25D 23/087; F25D 23/028; F25D 23/082; F25D 23/02; F25D 17/047; F25D 23/066;
(Continued)

(56) References Cited

U.S. PATENT DOCUMENTS 2,629,141 A * 2/1953 Palmer .................. F25D 23/082
                                                        49/496.1
4,116,213 A    9/1978 Kamezaki
(Continued)

FOREIGN PATENT DOCUMENTS

CN    103398527 A    11/2013
CN    106500442 A    3/2017
(Continued)

OTHER PUBLICATIONS

English translation for JPH08082472 (Year: 1996).*

*Primary Examiner* — Hiwot E Tefera
(74) *Attorney, Agent, or Firm* — Laurence A. Greenberg; Werner H. Stemer; Ralph E. Locher

(57) ABSTRACT

A refrigerator, in particular a domestic refrigerator, has a body and a closure element, which jointly delimit a storage chamber. A seal is provided, which is arranged between the body and the closure element and which is at least partly arranged in a seal receptacle. The seal receptacle has a passage section for bypassing the seal. Accordingly, the passage section has at least two passage channels.

21 Claims, 5 Drawing Sheets

(51) Int. Cl.
*F25D 23/08* (2006.01)
*F25D 23/06* (2006.01)

(58) Field of Classification Search
CPC .............. F25D 2201/04; F25D 23/085; F25D 2400/06; F25D 2201/126; F25D 21/04; F25D 2201/14; F25D 2400/04; F25D 23/069; F25D 23/025; E05Y 2800/12; E06B 7/16; E06B 7/215; E06B 7/2318; E06B 7/2303
USPC .......................................... 49/492.21, 489.1
See application file for complete search history.

(56) References Cited

U.S. PATENT DOCUMENTS

| | | | | |
|---|---|---|---|---|
| 4,644,698 | A * | 2/1987 | Gerdes | F25D 23/082 312/296 |
| 6,526,698 | B2 * | 3/2003 | Park | E05C 19/161 49/489.1 |
| 9,506,687 | B2 * | 11/2016 | Li | F25D 23/026 |
| 2009/0241585 | A1 * | 10/2009 | Diebold | F25D 17/047 62/406 |
| 2011/0220663 | A1 * | 9/2011 | Guba | F25D 17/047 220/592.02 |
| 2016/0178272 | A1 * | 6/2016 | Li | F25D 23/026 312/405 |
| 2017/0108266 | A1 * | 4/2017 | Kim | F25D 23/061 |
| 2018/0259244 | A1 * | 9/2018 | Kim | E06B 7/2307 |
| 2019/0128591 | A1 * | 5/2019 | Visin | F25D 23/085 |

FOREIGN PATENT DOCUMENTS

| | | | |
|---|---|---|---|
| DE | 102015220351 | A1 | 4/2017 |
| EP | 2947406 | A1 * | 11/2015 ........... F25D 17/047 |
| EP | 3006869 | A1 | 4/2016 |
| FR | 2445916 | A1 | 8/1980 |
| JP | H08082472 | A | 3/1996 |
| WO | 0106182 | A1 | 1/2001 |

* cited by examiner

REFRIGERATOR

BACKGROUND OF THE INVENTION

Field of the Invention

The invention relates to a refrigerator, in particular a household refrigerator, comprising a body and a door, which jointly delimit a storage chamber, and comprising a seal which is arranged between the body and the door and which is at least partly arranged in a seal receptacle, said seal receptacle having a passage section for bypassing the seal.

In such a refrigerator, in particular in a household refrigerator, such as for example an upright refrigerator, an upright freezer or a combined fridge-freezer, when the closure element is opened air flows out of the surroundings into the storage chamber. At the same time, relatively cool air inside the storage chamber is replaced by relatively warm air from the surroundings. After the closure element is closed, the air inside the storage chamber cools relatively quickly so that a negative pressure is formed in the storage chamber. This negative pressure makes it difficult to open the closure element again immediately afterwards.

In order to reduce a negative pressure produced in this manner in the storage chamber, it is known from the prior art to provide a passage section in the region of the seal for bypassing the seal. The actual purpose of the seal is namely to avoid an exchange of air between the surroundings and the storage chamber as soon as the closure element is closed. However, the passage section is also intended to ensure a sufficient exchange of air between the storage chamber and the surroundings even when the closure element is closed, so that a negative pressure which has been produced in the storage chamber is able to be reduced. The bypassing thus permits a minimal airflow to flow into the storage chamber, for example below the seal, despite the door being closed.

A household refrigerator comprising a refrigerator compartment and a freezer compartment and a pressure compensation valve is disclosed in DE 10 2015 220 351 A1. In this case DE 10 2015 220 351 A1 discloses an expansion region in which a seal region is arranged spaced apart from an inner face of the expansion region so that a permanently present gap is formed into which air may flow.

SUMMARY OF THE INVENTION

The object of the present invention is to provide a generic refrigerator which has improved properties relative to the prior art.

The object is achieved by a refrigerator as claimed in the independent claim. Accordingly, in a generic refrigerator it is provided that the passage section has at least two passage channels.

In this case the present invention is based on the recognition that a passage section with a minimum flow cross-section of a passage channel is required for the safe and rapid reduction of the negative pressure in the storage chamber. According to the invention, however, the flow cross-section required therefor is intended to be allocated to at least two passage channels. Since the flow cross-section of each individual passage channel may be dimensioned to be smaller than when using a single passage channel, therefore, the at least two passage channels may be integrated more easily into the refrigerator, in particular with fewer adaptations to the surrounding geometry. In particular, however, by the use of at least two passage channels the reliability of the passage section as a whole is increased. By forming at least two passage channels which are dimensioned to be correspondingly small this increases the strength locally in the region of the passage section. Undesired—or even merely small—deformations in this critical region, which may lead to a limited functionality when bypassing the seal, are significantly reduced. Moreover, even in adverse operating conditions, according to the invention the probability may be increased that at least a minimum of one further passage channel is provided for reducing the negative pressure if, for example, the seal (substantially) blocks a passage channel due to significant contact pressure of the closure element against the body. Finally, the invention also permits a relatively unobtrusive configuration of the passage section. The passage section according to the invention is thus less noticeable and/or not perceptible at all to a user even if the closure element is open.

The closure element may be formed by a door, a flap or a drawer front. In an open position of the closure element an internal region of the body, in particular the storage chamber for goods to be refrigerated or frozen, is partly or fully accessible to a user according to the opening angle. In a closed position the closure element may have an inner wall facing the body and an outer wall remote from the body. The inner wall and the outer wall of the closure element may delimit a hollow space filled with thermally insulating material.

The seal is arranged at least in some sections between the body and the closure element. In particular, the seal may be arranged entirely between the body and the closure element. The seal receptacle may be configured either on the body or on the closure element. In particular, it is possible that the seal receptacle is formed by a receiving groove which is formed on the closure element and which, in particular, is closed over the periphery.

Since the passage section bypasses the seal, the passage section permits an exchange of air between the storage chamber and the surroundings when the closure element is closed.

Embodiments of the invention are specified in the dependent claims.

According to one embodiment, it is provided that the at least two passage channels are arranged at an angle, preferably between 60 degrees and 120 degrees, further preferably between 75 degrees and 105 degrees, relative to a longitudinal direction of the seal receptacle. It is conceivable, in particular, that the at least two passage channels are arranged at an angle of substantially 90 degrees relative to a longitudinal direction of the seal receptacle. In other words, a longitudinal direction of the at least two passage channels is arranged transversely relative to a longitudinal direction of the seal receptacle. In each case, "longitudinal direction" is to be understood here as the main direction of extent of the seal receptacle, for example the receptacle groove, and/or a passage channel. Such an orientation of the at least two passage channels relative to the seal receptacle permits a very compact configuration of the passage section.

Thus in principle it is possible that the at least two passage channels are formed by substantially closed, i.e. tubular, channels. Simple manufacture of the passage section and/or cleaning of the passage channels is possible, however, by the at least two passage channels being delimited in each case, in particular exclusively, by two side walls and a bottom wall. The at least two passage channels may, therefore, be formed by grooves or narrow channels. In particular, therefore, it may be provided that the at least two passage channels are configured to be open upwardly when the passage section is viewed perpendicular thereto. The side walls of the at least two passage channels may be formed by walls which are separate from one another. Cross-sections of the at least two passage channels may, for example, have a semi-circular curved shape, a U-shape or a V-shape. The cross-section of a passage channel is formed by a section along a plane located perpendicular to the longitudinal direction of the passage channel. The at least two passage channels may have in the longitudinal direction thereof a uniform cross-section or a cross-section which alters in the longitudinal direction thereof. The cross-sections of the at least two passage channels may be identical to one another or different from one another.

According to one embodiment, it is provided that a seal stop is arranged in the passage section, said seal stop being in contact with a section of the seal in at least one operating state of the seal. Thus the seal stop is able to prevent and/or limit the seal being pushed into the passage section. In this manner, the seal may be prevented from blocking the at least two passage channels. The at least one operating state may, for example, be an operating state which occurs in the case of a refrigerator when the closure element is closed and an internal pressure prevails in the storage chamber which substantially corresponds to an external pressure in the surroundings of the refrigerator (normal operating state). Accordingly, in this regularly occurring operating state the seal stop already prevents the seal from being pushed into the passage section. The at least one operating state, however, may also be an operating state which is present in the case of a refrigerator when the closure element is closed and an internal pressure prevails in the storage chamber which is lower than an external pressure in the surroundings of the refrigerator (temperature compensating operating state). This operating state is produced after the opening of the closure element, the resulting forced inflow of relatively warm ambient air into the storage chamber and a subsequent closure of the closure element. In this variant, it may be provided that the seal stop is designed such that whilst the seal is in contact therewith in the temperature compensating operating state, in the normal operating state a gap is present between the seal and seal stop. In this variant, therefore, the seal is not in contact with the seal stop in the normal operating state. In the normal operating state, therefore, a relatively large flow cross-section is available for the inflow of air into the storage chamber, whilst at least a minimal flow cross-section is present in the temperature compensating operating state. According to this embodiment, the section of the seal in contact with the seal stop may, for example, be formed entirely or partly by a sealing foot. Two, three, four or more seal stops may be arranged in the passage section. It is conceivable that the two, three, four or more seal stops are configured identically or at least substantially identically to one another and/or are arranged adjacent to passage channels. In particular, it is conceivable that in each case a seal stop and a passage channel preferably alternate in the longitudinal direction of the seal receptacle.

According to one embodiment, it is provided that the at least two passage channels are arranged in an immediate vicinity. In this case, "immediate vicinity" is to be understood as a notional cube which is as small as possible enclosing the passage channels, having a maximum edge length of less than 30 cm, preferably of less than 20 cm, further preferably of less than 15 cm and even further preferably of less than 10 cm. Thus, for example, it may be provided that in the longitudinal direction of the seal receptacle the passage section extends over less than 30 cm, preferably over less than 20 cm, further preferably over less than 15 cm, even further preferably over less than 10 cm. It is also conceivable that a maximum spacing of the at least two passage channels is less than 20 cm, preferably less than 10 cm, further preferably less than 5 cm and even further preferably less than 3 cm. As a result, a very compact construction of the passage section is possible with a noticeable increase in the local strength. Moreover, the use of an optional heating element is facilitated: if an electrical heating element or a so-called hot gas line of the refrigerant circuit is intended to heat the passage section to a minimum temperature in order to avoid condensation of water in this section, the heating element may be designed to be correspondingly compact, simple and cost-effective. According to one embodiment, therefore, it is provided that a heating element is arranged in an immediate vicinity of the passage section, in particular the heating element is arranged solely in the immediate vicinity of the passage section.

According to one embodiment, it is provided that the at least two passage channels, in particular the passage section, are configured integrally in a component comprising the seal receptacle. The increase in strength of the passage section thus has an effect at the same time on the component comprising the seal receptacle. In particular, it may be provided that this component consists of plastic material. For example, it may be a plastic blank which is reshaped by thermoforming. This embodiment also permits simple and cost-effective manufacture since the seal receptacle and the passage channels, in particular the passage section, may be configured in one manufacturing step. In this embodiment, it is provided that the seal receptacle and the passage section are integrally configured in an inner wall of the closure element, for example the door, facing the storage chamber. The inner wall may in this case, in particular, correspond to a so-called inner liner. It is conceivable that the inner wall is partly or entirely produced by thermoforming. In order to permit production without the use of additional sliders in the thermoforming tool, it may be provided that the seal receptacle and/or the passage section including the at least two passage channels, when viewed perpendicular to a main extension plane of the inner wall, is configured to be at least substantially without undercuts.

In order to increase the strength of the passage section and at the same time to prevent and/or to limit further the seal being pushed into the at least two passage channels, according to one embodiment it is provided that a width of at least one passage channel corresponds to a maximum of three times the width of the seal receptacle, preferably corresponds to a maximum of twice the width of the seal receptacle, and further preferably substantially corresponds to the width of the seal receptacle. If the seal receptacle has a groove or is formed by a groove, in particular it may be provided that a width of at least one passage channel corresponds to a maximum of three times the width of the groove, preferably a maximum of twice the width of the groove, and further preferably substantially corresponds to the width of the groove. It is virtually eliminated, therefore, that the seal is pushed into these relatively narrow passage channels. The "width" of a passage channel in this case is to be understood as the average width which is measured transversely to the longitudinal direction and/or longitudinal extent thereof. In particular, it may be provided that the width measured at an upper end portion of the passage channel corresponds to the values of this embodiment.

According to a first feature of the invention, according to one embodiment it is provided that the at least two passage channels are configured separately from one another. The at least two passage channels may in this case be configured substantially or entirely identically relative to the length and/or the width and/or the cross-sectional shape thereof.

According to one embodiment, it is provided that the at least two passage channels run substantially parallel to one another.

According to one embodiment, it is provided that cross-sections in a cutting plane perpendicular to a longitudinal direction of the seal receptacle through the at least two passage channels are at least substantially identical. In particular, the at least two passage channels have an identical length.

According to one embodiment, it is provided that a seal stop is configured between the at least two passage channels, said seal stop preferably being in contact with a section of the seal. The central arrangement of the seal stop relative to the at least two passage channels thus produces an effective prevention of the seal being pushed into both passage channels immediately adjacent to the seal stop. A section along a plane through the seal stop, located perpendicular relative to the longitudinal direction of the seal receptacle, may substantially or entirely correspond to a section along a plane outside the passage section, located perpendicular relative to the longitudinal direction of the seal receptacle. The seal stop may, in particular, receive a section of the seal, for example a sealing foot. To this end, the seal stop may have a receptacle, for example a groove running in the longitudinal direction of the seal receptacle. It is also possible that further sections of the seal (for example a sealing lip) are in contact with the seal stop. To this end, the seal stop may have one or more stop surfaces. In particular, it is possible that the seal stop also receives and/or supports the seal in the normal operating state. In the longitudinal direction of the seal receptacle, the seal stop may be configured centrally between the at least two passage channels.

According to a second aspect of the invention, according to one embodiment it is provided that a passage channel is configured at least in some sections, preferably entirely, inside a further passage channel. In particular, it may be provided that a second passage channel is arranged inside a first passage channel. In this case, the first passage channel may have a greater width relative to the second passage channel. The second passage channel may be configured in a base and/or a bottom wall of the first passage channel. By this aspect of the invention, in particular, it is possible that, on the one hand, a passage section with a large flow cross-section (corresponding to the sum of the cross-sections of both passage channels) is present. By means of this embodiment, however, on the other hand, it may be ensured in a simple and reliable manner that even by the seal being pushed into the first passage channel and the first passage channel being at least partially closed as a result, however, the second passage channel further permits an exchange of air between the storage chamber and the surroundings. Thus in this second aspect of the invention, in particular, according to one embodiment it may be provided that in a first operating state of the seal the at least two passage channels bypass the seal and in a second operating state of the seal one passage channel is partly or entirely blocked by the seal and one passage channel bypasses the seal. The first operating state in this case, for example, may correspond to the normal operating state, whilst the second operating state, for example, may correspond to the temperature compensating operating state.

Due to the possibility of configuring the at least two passage channels to be relatively small, so that these passage channels are barely perceptible or not perceptible at all to a user, the passage section may be arranged at the point where the effect of the reduction of the negative pressure in the storage chamber is at the greatest. According to one embodiment, it is provided that the passage section is arranged on a vertically running section of the seal receptacle. It is conceivable that the passage section is substantially arranged vertically and centrally relative to the seal receptacle.

According to one embodiment, it is provided that two or more passage sections according to the invention are provided on the refrigerator. The two or more passage sections may be configured substantially or entirely identically to one another.

According to one embodiment, it is provided that the passage section has at least three passage channels, preferably at least four passage channels, further preferably more than four passage channels. In order not to fall below a minimum size of individual passage channels relative to their cross-section and thus, as before, to permit simple and cost-effective manufacture, according to one embodiment it is provided that fewer than 20, preferably fewer than 15 and further preferably fewer than ten passage channels are configured in one passage section.

The at least two passage channels may, in particular, represent an expansion region of the seal receptacle, in particular an expansion region of the groove of the seal receptacle.

The at least two passage channels may, in particular, run in a linear manner. In this case, air may flow directly through a passage channel from the surroundings into the storage chamber. The passage section is thus of very compact construction.

The seal consists, in particular, of resilient material, namely rubber. The seal may have a sealing foot, which is preferably fastened in the seal receptacle, for example a groove, and holds the seal therein. The seal may have one, two or more sealing lips and/or one or two or more hollow chambers. The seal may be an extruded profile.

BRIEF DESCRIPTION OF THE SEVERAL VIEWS OF THE DRAWING

Exemplary embodiments of the present invention are described with reference to the accompanying figures, in which.

DESCRIPTION OF THE INVENTION

Figure 1:
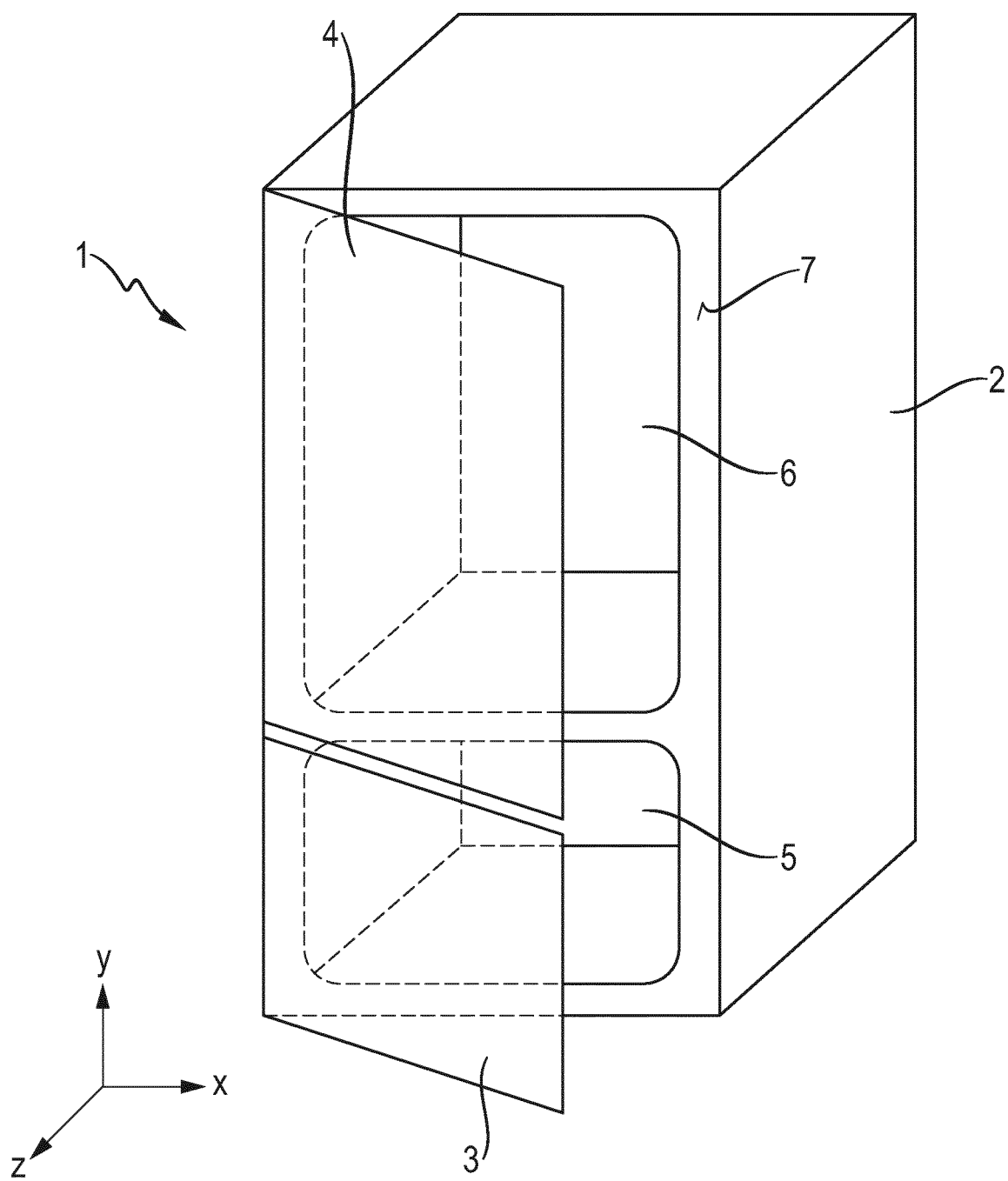
FIG. 1 shows a simplified perspective view of a first exemplary embodiment of a household refrigerator.

Elements which are the same or functionally the same are provided with the same reference characters.

A simplified view of a household refrigerator 1 as an example of a refrigerator according to the invention which is a combined fridge-freezer and which is configured to receive foodstuffs is shown in FIG. 1. The household refrigerator 1 comprises a body 2 and two doors 3, 4 as closure elements. The doors 3, 4 are fastened in an articulated manner to the body 2 and serve for closing two storage chambers 5, 6. A front face 7 which is configured in two parts on the body and faces the doors 3, 4 serves as a stop surface for seals, not shown, which are fastened to the lower door 3 and the upper door 4 in a seal receptacle.

Both doors 3, 4 comprise an outer door wall and an inner door wall which together delimit a hollow space filled with insulating material. The seals are arranged in seal receptacles on the respective inner door walls.

Figure 2:
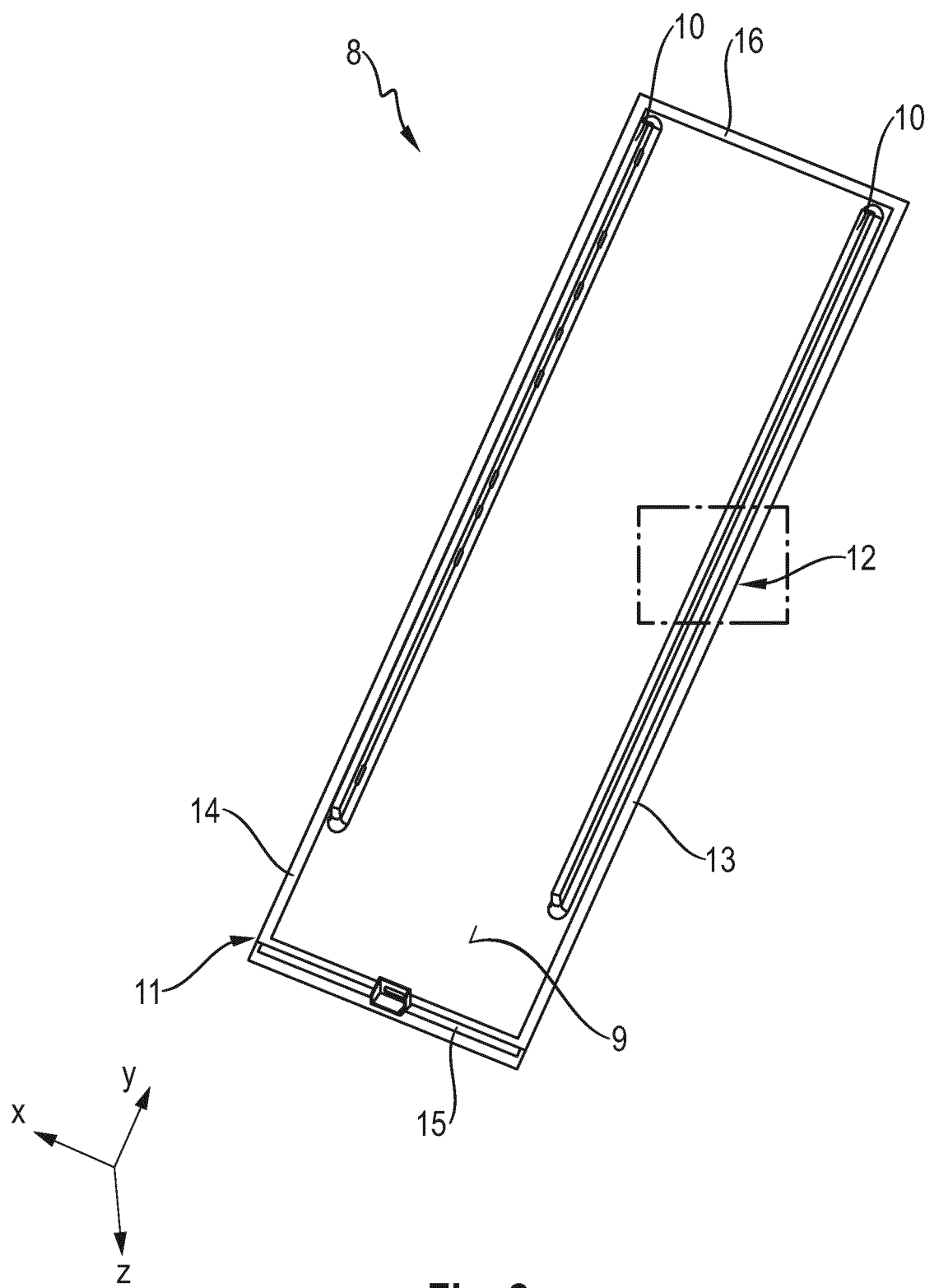
FIG. 2 shows a view of an inner wall of a door of the household refrigerator according to FIG. 1.

The inner wall 8 of the door 4 is shown in FIG. 2. The three-dimensional view shows the surface 9 facing the storage chamber 6. The inner wall 8 consists of plastic material and is produced by thermoforming from a plastic blank. The inner wall 8 has two longitudinal members 10 which serve for fastening door trays, not shown. The inner wall 8 has a peripheral, in particular peripherally closed, seal receptacle 11. The seal receptacle 11 is formed by a groove 21 (see FIG. 3). The seal receptacle 11 has two vertically running sections 13, 14 and two horizontally running sections 15, 16. Each of the sections 13-16 runs in a linear manner. Each of the sections 13-16 has a main direction of extent, the respective section substantially extending along said main direction of extent, i.e. a longitudinal extent of the respective section 13-16 running in said main direction of extent. Thus the two vertical sections 13, 14 have vertically oriented longitudinal extents and the two horizontal sections 15, 16 have horizontally oriented longitudinal extents. The term "vertical" always refers to a household refrigerator which is positioned as intended.

The groove 21 and/or the seal receptacle 11 is configured to be open in the direction of the storage chamber 6. The groove 21 and/or the entire seal receptacle 11 is configured integrally in the inner wall 8 and serves for receiving and holding a seal, not shown.

A passage section 12 is formed in the detail which is shown for illustrative purposes in dashed lines. The passage section 12 serves for bypassing the seal, i.e. for the exchange of the air of the storage chamber 6 with the surroundings when the door is closed 4.

Figure 3:
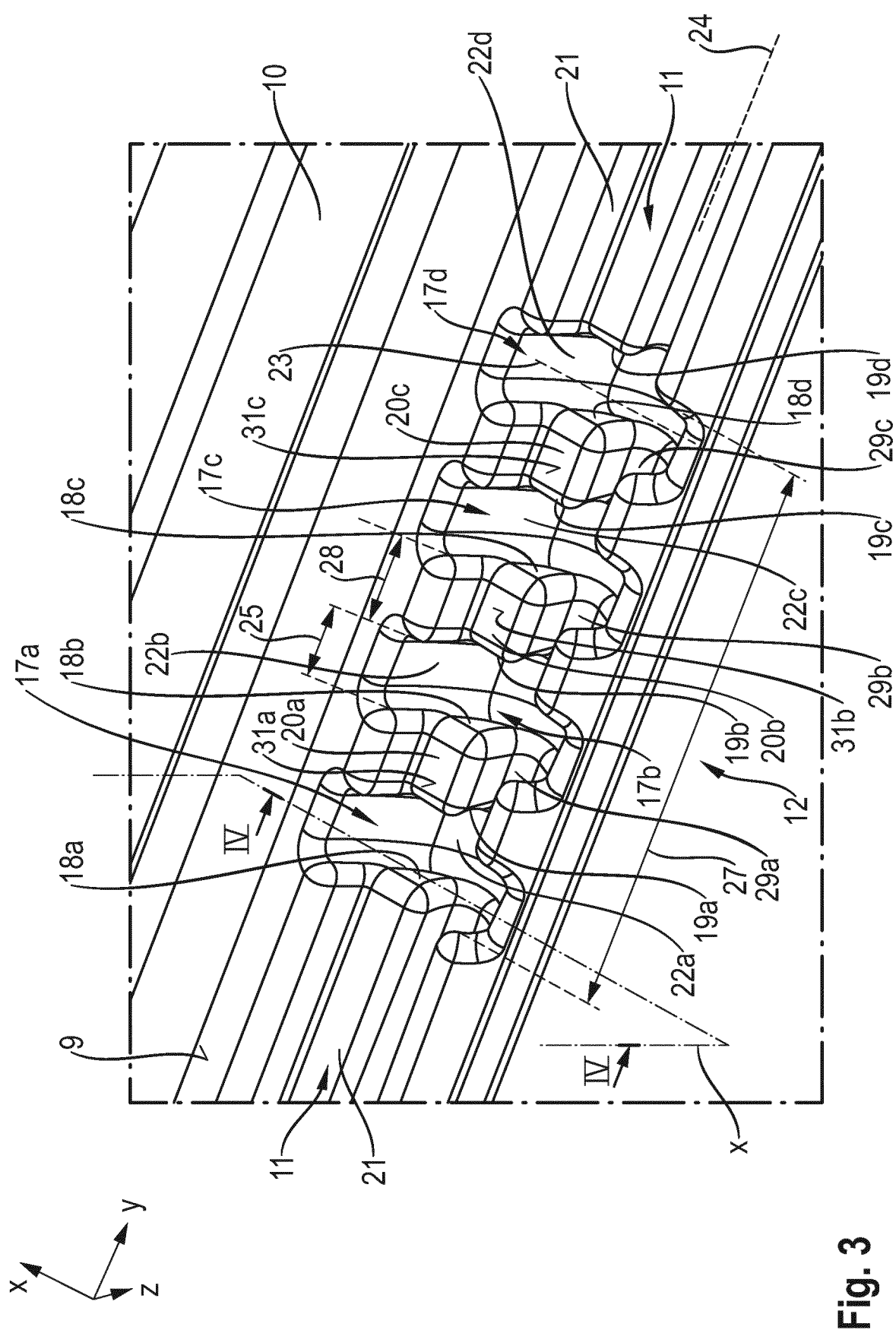
FIG. 3 shows a detail of the inner wall according to FIG. 2.

In FIG. 3 the detail shown in dashed lines in FIG. 2 is shown enlarged. In this exemplary embodiment the passage section 12 comprises four passage channels 17a, 17b, 17c, 17d. The passage channels 17a-17d are configured separately from one another and integrally in the inner wall 8. Each two adjacent passage channels 17a-17d are spaced apart and separated from one another by an individual seal stop 20a, 20b, 20c. The passage channels 17a-17d and the seal stops 20a-20c thus alternate with one another. Both the individual passage channels 17a-17d and the individual seal stops 20a-20c are configured in each case identically to one another.

The passage channels 17a-17d represent an expansion region of the seal receptacle 11, in particular of the groove 21. Each passage channel 17a-17d is formed by a groove which is open in the direction of the surface 9 and in each case has two side walls 18a, 18b, 18c, 18d and/or 19a, 19b, 19c, 19d and a bottom wall 22, 22b, 22c. The passage channels 17a-17d run parallel to one another, i.e. their respective longitudinal directions are also parallel to one another. The longitudinal directions 23 of the passage channels 17a-17d are at an angle of 90 degrees relative to a longitudinal direction 24 of the seal receptacle 11, i.e. the passage channels 17a-17d run transversely relative to the seal receptacle 11. The passage channels 17a-17d in each case have the same width 25. The width 25 is less than twice as large as a width 26 of the groove 21 of the seal receptacle 11 (see FIG. 4). The seal stops 20a-20c in each case have the same width 28 which substantially corresponds to the width 25 of the passage channels 17a-17d. The length 27 of the passage section 12 measured in the direction of extension, i.e. the longitudinal direction 24 of the seal receptacle 11, corresponds to the sum of the widths 25 and 28 of all of the passage channels 17a-17d and all of the seal stops 20a-20c. The length 27 of the passage section 12 in this exemplary embodiment is less than 10 cm.

Figure 4:
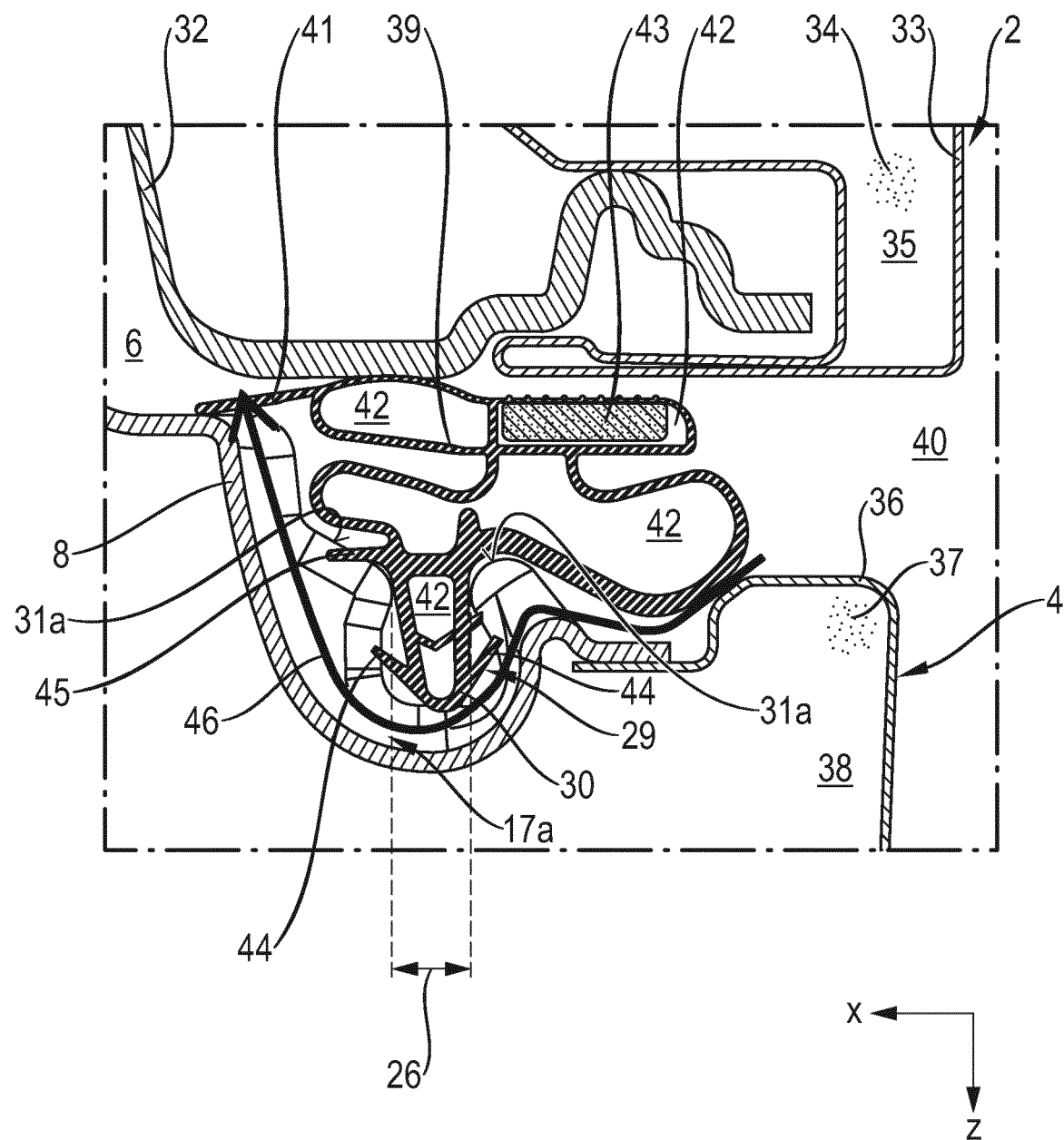
FIG. 4 shows a sectional view through the household refrigerator according to FIG. 1.

Each seal stop 20a-20c has a receptacle 29a, 29b, 29c formed by a groove which runs parallel to the longitudinal direction 24 of the seal receptacle 11 and which is configured to receive a sealing foot 30 (see FIG. 4). Stop surfaces 31a, 31b, 31c adjoin the receptacles 29a-29c transversely to the longitudinal direction 24. These stop surfaces 31a-31c are configured to come into contact with sections of the seal (see FIG. 4). The receptacles 29a-29c and the stop surfaces 31a-31c prevent the seal from being pushed into the passage section 12 and thus, in particular, into the passage channels 20a-20c. In this exemplary embodiment, in the normal operating state contact is already present between the receptacles 29a-29c and the seal (sealing foot 30) and between the stop surfaces 31a-31c and the seal (stop lip 41).

Sections along a plane through the seal stops 20a-20c, which is located perpendicular to the longitudinal direction 24 of the seal receptacle 11, correspond to a section along a plane which is outside the passage section 12 and which is located perpendicular to the longitudinal direction 24 of the seal receptacle 11. In particular, as a result, an equally effective guidance and fastening of the seal is ensured by the receptacles 29a-29c and by the stop surfaces 31a-31c as is present outside the passage section 12.

FIG. 4 shows a section through the household refrigerator 1 along the cutting plane X located perpendicular to the longitudinal direction 24 of the seal receptacle 11 (FIG. 3) when viewed in a vertically upward direction. In FIG. 4 the door 4 is closed and closes the storage chamber 6 which is located substantially inside the body 2. The body consists of an internal container 32 and an outer wall 33 which together delimit a hollow space 35 filled with insulating material 34. The door 4 comprises an outer wall 36 in addition to the inner wall 8. The inner wall 8 and the outer wall 36 delimit a hollow space 38 filled with insulating material 37. The storage chamber 6 is substantially entirely sealed by a seal 39 relative to the surroundings 40 of the household refrigerator 1. In addition to the sealing foot 30 the seal 39 comprises a sealing lip 41 which bears against the inner wall 8 and a plurality of hollow chambers 42. A magnet 43 is arranged in one of the hollow chambers 42, said magnet ensuring that the seal 39 is attracted to the metal outer wall 33. The seal consists of rubber.

The sealing foot 30 has resilient lips 44, said sealing foot being anchored thereby in the receptacle 29a. Moreover, the seal 39 has a stop lip 45 which is resiliently supported on the stop surface 31a. For illustrative purposes the lips 44 and the stop lip 45 are shown in a non-deflected state and/or undeformed state.

As shown by the arrow 46, air flows from the surroundings 40 into the storage chamber 6 as soon as said storage chamber has a negative pressure relative to the surroundings 40. The air flows in this case through the passage channel 17a. The passage channel 17a (and/or the remaining passage channels 17b-17d) and thus the passage section 12, therefore, bypass the seal 39. When air flows into the storage chamber 6 the sealing lip 41 lifts up so that air may flow through below said sealing lip.

Figure 5:
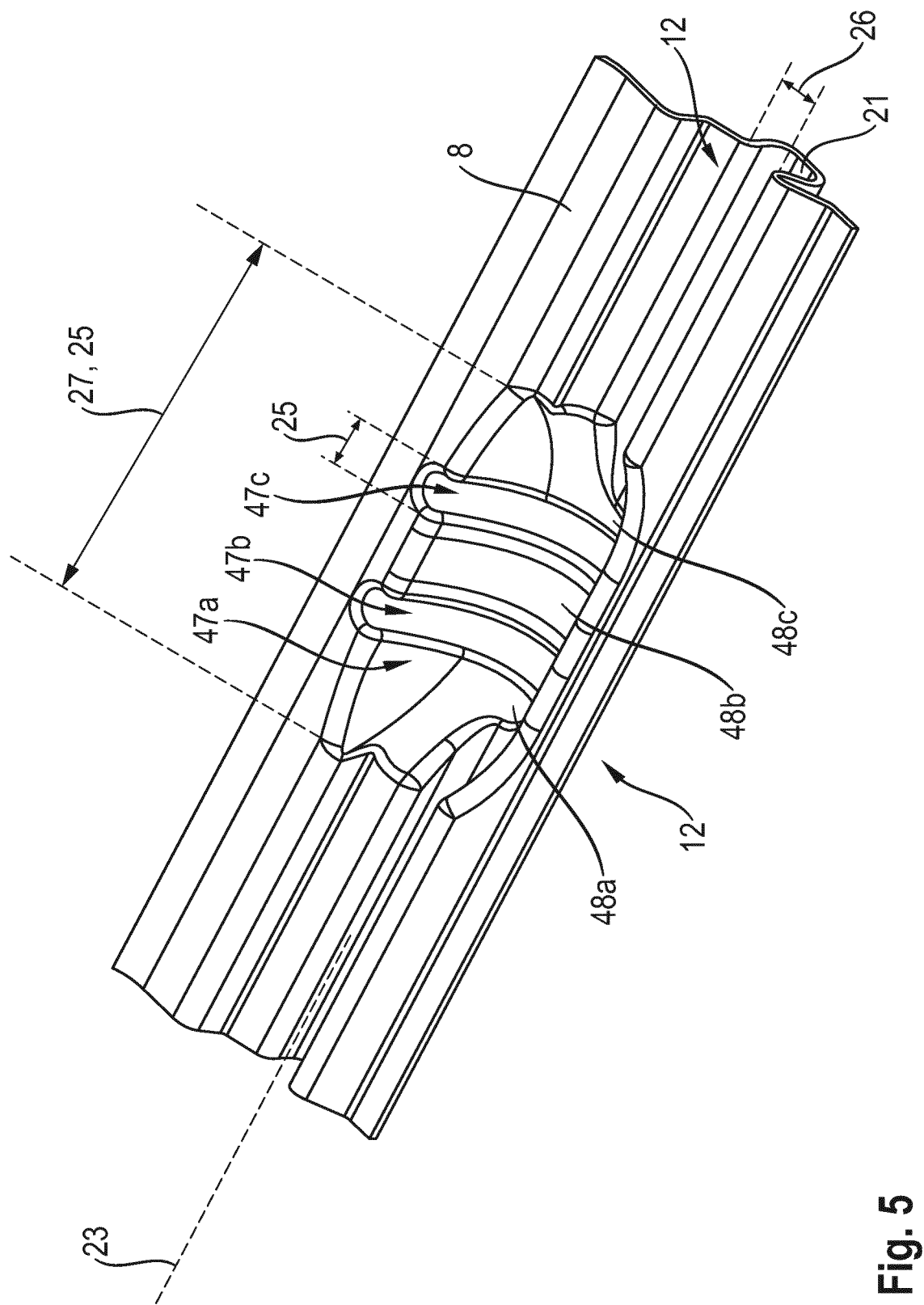
FIG. 5 shows a detail of an inner wall of a second exemplary embodiment.

FIG. 5 shows a detail of a door of a second exemplary embodiment. A perspective view of a detail (an edge section) of an inner wall 8 is comparable with the view according to FIG. 3. The passage section 12 has in this exemplary embodiment three passage channels 47a, 47b, 47c. Two passage channels 47b, 47c are configured separately from one another and parallel to one another. These two passage channels 47b, 47c are arranged in a larger passage channel 47a. The width of the larger passage channel 47a substantially corresponds to the length 27 of the passage section 12. The width of the smaller passage channels 47b, 47c substantially corresponds to the width 26 of the groove 21.

The passage section 12 has sealing stops 48a, 48b, 48c which are configured to prevent the seal 39 from being pushed into the two smaller passage channels 47b, 47c. In the normal operating state, it is possible for air from the surroundings 40 to flow into the storage chamber 6 through all three passage channels 47a, 47b, 47c. However, for example in the temperature compensating operating state, if a significant negative pressure prevails in the storage chamber 6 relative to the surroundings 40 and the seal 39 is significantly compressed between the body 2 and the door, this seal may close the passage channel 47a in some sections or entirely. In this case, the sealing stops 48a, 48b, 48c ensure that the seal 39 is not pushed further into the passage section 12, in particular that the seal 39 is not pushed into the passage channels 47b, 47c. The negative pressure prevailing in the storage chamber 6 may be reduced by means of the two smaller passage channels 47b, 47c.

REFERENCE CHARACTERS

1 Household refrigerator
2 Body
3 Door
4 Door
5 Storage chamber
6 Storage chamber
7 Front face
8 Inner wall
9 Surface
10 Longitudinal member
11 Seal receptacle
12 Passage section
13 Vertical section
14 Vertical section
15 Horizontal section
16 Horizontal section
17a, 17b, 17c, 17d Passage channel
18a, 18b, 18c, 18d Side wall
19a, 19b, 19c, 19d Side wall
20a, 20b, 20c Seal stop
21 Groove
22a, 22b, 22c, 22d Bottom wall
23 Longitudinal direction (passage channel)
24 Longitudinal direction (seal receptacle)
25 Width (passage channel)
26 Width (groove)
27 Length (passage section)
28 Width (seal stop)
29a, 29b, 29c Receptacle
30 Sealing foot
31a, 31b, 31c Stop surface
32 Internal container
33 Outer wall
34 Insulating material
35 Hollow space
36 Outer wall
37 Insulating material
38 Hollow space
39 Seal
40 Surroundings
41 Sealing lip
42 Hollow chamber
43 Magnet
44 Lip
45 Stop lip
46 Arrow
47a, 47b, 47c Passage channel
48a, 48b, 48c Seal stop

The invention claimed is:

1. A refrigerator, comprising:
a body;
a closure element attached to said body, said body and said closure element jointly delimit a storage chamber, said closure element having a seal receptacle formed therein;
a seal extending in a longitudinal direction and disposed between said body and said closure element and is at least partly disposed in said seal receptacle; and
said seal receptacle having a passage section for bypassing said seal, said passage section having at least two passage channels each having a respective passage channel width in said longitudinal direction;
a seal stop configured between said at least two passage channels, said seal stop having a seal stop width in said longitudinal direction being substantially equal to each said respective passage channel width.

2. The refrigerator according to claim 1, wherein said at least two passage channels are disposed at an angle relative to a longitudinal direction of said seal receptacle, wherein said angle is between 75 degrees and 105 degrees.

3. The refrigerator according to claim 1, wherein said at least two passage channels are delimited in each case by two side walls and a bottom wall.

4. The refrigerator according to claim 1, wherein said at least two passage channels are disposed in an immediate vicinity.

5. The refrigerator according to claim 1, wherein at least one of said passage channels has a width which corresponds to a maximum of twice a width of said seal receptacle.

6. The refrigerator according to claim 1, wherein said at least two passage channels run substantially parallel to one another.

7. The refrigerator according to claim 1, wherein cross-sections in a cutting plane perpendicular to a longitudinal direction of said seal receptacle through said at least two passage channels are at least substantially identical.

8. The refrigerator according to claim 1, wherein in a first operating state of said seal said at least two passage channels bypass said seal and in a second operating state of said seal one of said passage channels is partly or entirely blocked by said seal and another one of said passage channels bypasses said seal.

9. The refrigerator according to claim 1, wherein said passage section is configured integrally in a component containing said seal receptacle.

10. The refrigerator according to claim 1, wherein said seal stop is in contact with a section of said seal.

11. The refrigerator according to claim 1, wherein the refrigerator is a household refrigerator.

12. The refrigerator according to claim 1, wherein said seal has a sealing lip configured to be lifted by an air flow bypassing under said seal via said passage section.

13. The refrigerator according to claim 12, wherein said closure element has an inner wall and said sealing lip seals against said inner wall.

14. The refrigerator according to claim 12, wherein said sealing lip is a cantilever.

15. A refrigerator, comprising:
a body;
a closure element attached to said body, said body and said closure element jointly delimit a storage chamber, said closure element having a seal receptacle formed therein, said seal receptacle having a longitudinal direction extending along said closure element and a receptacle cross section;
a seal disposed between said body and said closure element and is at least partly disposed in said seal receptacle, said seal having a foot for engaging said seal receptacle and holding said seal in said seal receptacle; and
said seal receptacle having a passage section including two passage channels spaced apart from one another in said longitudinal direction and each being a respective expansion region of said receptacle cross section for defining a gap between said foot and said closure element, said gap being a bypass for an airflow under and around said seal.

16. The refrigerator according to claim 15, wherein said two passage channels are spaced apart from one another in a longitudinal direction of said seal by a seal stop, said seal stop has a receptacle for said foot and a stop surface that contacts said seal.

17. The refrigerator according to claim 16, wherein said stop surface is constructed to prevent said seal from being pushed into said two passage channels.

18. A refrigerator, comprising:
a body;
a closure element attached to said body, said body and said closure element jointly delimit a storage chamber, said closure element having a seal receptacle defined by a receptacle groove;
a seal disposed between said body and said closure element and is at least partly disposed in said seal receptacle; and
said seal receptacle having a passage section including two passage channels and a seal stop disposed between said two passage channels, said seal stop having a seal stop groove matching said receptacle groove for holding said seal between said two passage channels, said two passage channels each being an expansion region between said receptacle groove and said seal stop groove and defining a bypass for an airflow under said seal.

19. The refrigerator according to claim 18, wherein said two passage channels are spaced apart from one another in a longitudinal direction of said seal.

20. The refrigerator according to claim 19, wherein said seal stop defines a longitudinal spacing between said two passage channels.

21. The refrigerator according to claim 18, wherein said seal stop has a stop surface that contacts said seal.

* * * * *